United States Patent [19]
Andros et al.

[11] Patent Number: 5,956,923
[45] Date of Patent: Sep. 28, 1999

[54] METHOD AND APPARATUS FOR INSTALLING, RETRIEVING AND REUSING PROTECTIVE COVERINGS FOR PLANTS, VINES AND TREES

[75] Inventors: Mathew J. Andros, Santa Margarita; Roger M. Castadio, Atascadero; Scott J. Welcher, Templeton; Michael R. Taber; Lon M. Martin, both of Clovis, all of Calif.

[73] Assignee: Leucadia, Inc., N.Y.

[21] Appl. No.: 08/972,003

[22] Filed: Nov. 17, 1997

[51] Int. Cl.⁶ ..................................................... B65B 11/00
[52] U.S. Cl. .................................. 53/397; 53/580; 53/492; 53/381.1; 47/28.1; 242/403; 242/557
[58] Field of Search .............................. 53/397, 580, 594, 53/492, 381.1, 390; 242/403, 557; 47/20, 26, 28.1, 29

[56] References Cited

U.S. PATENT DOCUMENTS

| | | | |
|---|---|---|---|
| 1,694,954 | 12/1928 | Stack | 53/397 |
| 3,077,314 | 2/1963 | Caperton | 242/403 |
| 3,395,485 | 8/1968 | Rooklidge | 242/557 |
| 3,559,905 | 2/1971 | Palynchuk | 242/403 |
| 3,800,468 | 4/1974 | De Graff | 47/28.1 |
| 3,968,940 | 7/1976 | Godbersen | 242/403 |
| 4,318,514 | 3/1982 | Weberg | 47/28.1 |
| 4,483,127 | 11/1984 | Forkner | 53/580 |

Primary Examiner—Linda Johnson
Attorney, Agent, or Firm—Vidas, Arrett & Steinkraus, P.A.

[57] ABSTRACT

The present invention provides improved implements and methods for dispensing and retrieving protective crop covering materials (PCCM) onto/from rows of crops, particularly vineyard crops, to protect the plants from nuisance birds and weather conditions which cause damage to the crops. Basically, there is disclosed herein a system for layout of PCCM from a bulk roll of PCCM onto crops, a system for retrieving the PCCM from the crops and disposing it or storing said PCCM on reusable spools and a system for layout of the PCCM from the reusable spools.

26 Claims, 10 Drawing Sheets

NETTING

METHOD AND APPARATUS FOR INSTALLING, RETRIEVING AND REUSING PROTECTIVE COVERINGS FOR PLANTS, VINES AND TREES

FIELD OF THE INVENTION

This invention relates to agricultural implements. More particularly, to implements for laying and retrieving/retracting protective netting and other crop protection materials onto/from agricultural crops, including, but not limited to berries, kiwi, apples, grapes, or any other crop which is grown in a row formation or on a trellis, to protect the plants from predators and/or other potential damage from weather i.e., frost, rain, hail, wind and sun, and to enhance growth and productivity.

BACKGROUND OF THE INVENTION

Implements for applying protective coverings on various surfaces have been previously known and used. Many devices have been used in agriculture for laying a covering on the ground or protecting certain types of agricultural plants. Typically, these devices are used in conjunction with a tractor and a normal hitch system utilizing hydraulic equipment.

The main purpose of the protective coverings of the present invention is the prevention of damage caused by particular animals, most notably birds, which feed on the various agricultural plants, most particular finches, starlings and sparrows, and by other potential damages as the result of weather i.e., frost, rain, hail, wind and sun. In the case of vineyards, the birds feed on the foliage and grapes, eventually damaging the crop. By applying a protective covering over the plants, the nuisance birds are prevented from damaging the crop and the crops are protected from damaging weather. The present invention is directed at applying and retrieving such protective coverings.

Typically, large bulk rolls of coverings have been dispensed on, or retrieved from, crops by elevating the rolls above the crops and unrolling/retrieving the covering onto the crops. Due to the great weight and unwieldy nature of the roll, this method may be quite dangerous and difficult. The present invention provides an easier and more controlled method, in that the bulk rolls are placed low to the ground for greater safety and stability and the reusable coverings may be retrieved onto small spools that are easy to manhandle, move and store and reuse.

Some machines that spread or provide covering for plants include the following:

U.S. Pat. No. 3,395,485, issued to Ricklidge on Aug. 6, 1968, discloses a crop protecting plastic dispensing mechanism attachment for a tractor or jeep which is moved between rows of fruit trees and dispenses a thin layer of plastic from a large roll through rollers and over the row of trees.

U.S. Pat. No. 1,957,994, issued to Eccher on May 8, 1934, discloses a motorized wheeled frame for dispensing covering material from a roll on the frame over trees in an orchard.

U.S. Pat. No. 4,318,514, issued to Weberg on Mar. 9, 1982, discloses a machine for applying and retracting a protective covering to agriculture plants. The implement is supportively attached by forward and rearward attachment mechanisms to a tractor and movably supported additionally by a coaster wheel laterally spaced from the tractor. Vertically oriented supports and rearward attachment mechanisms and front attachment to a wheel to support a horizontally oriented, substantially rectangular frame. A rotatable shaft mechanism attached to a universal joint is supported at the ends by shaft supports which extend upwardly from the rearward portion of the frame.

U.S. Pat. No. 3,791,069, issued to Nelson on Feb. 12, 1974, discloses an orchard tree covering device for use in placing individual covers or strips of cover material over orchard trees to prevent frost damage. The device is adapted to fit on conventional tractors and includes an adjustable elevational support and a cover holding magazine. The magazine is designed to hold a plurality of covers and includes means for selectively releasing individual covers onto trees below. In an alternate form, the covers are connected in trips and rolled onto spools. The strips may then be reeled out by the device over long rows of trees.

The present invention provides improved implements and methods of laying and retrieving protective covering materials over crops to prevent damage to said crops.

SUMMARY OF THE INVENTION

The present invention provides improved implements and methods for dispensing and retrieving protective crop covering materials (PCCM), such as, but not limited to, netting, such as bi-axially oriented polypropylene netting, films, such as blown poly films, ether cloth fabrics, plastic sheets and woven or nonwoven fabrics, on/from crops, particularly vineyard crops, to protect the plants from nuisance birds and weather conditions which cause damage to the crops. Basically, there is disclosed herein a system for layout of PCCM from a bulk roll of PCCM onto crops, a system for retrieving the PCCM from the crops and disposing it or storing said PCCM on reusable spools and a system for layout of the PCCM from the reusable spools.

The bulk roll layout system generally consists of a rolling cradle utilizing powered or idler rollers to layout bulk rolls of material from a low ground profile, wherein the roll is carried between and parallel with the rows of crops, up and over the crop through a sweep attached to a tower which reduces the material as it leaves the rolls and enters the sweep and then expands the material as it is introduced onto the crop row. This rolling cradle can be mounted on a dedicated trailer or in a frame that is designed to attach to a standard trailer.

The retrieval system consists of a hydraulically driven arbor shaft (preferably a 1½ arbor shaft) that accepts spools for retrieval of PCCM for reuse or disposal. The shaft is mounted into a frame that is then hitched to a tractor. The PCCM is retrieved evenly onto plastic spools for reuse at a later time or onto a permanent spool that facilitates disposal in tightly compacted rolls. PCCM is pulled off the vine row utilizing the same tower and sweep arrangement used in the above mentioned bulk roll laying system. This tower arrangement is manipulated over the rows of crops by attaching it to the same frame that carries the retrieval head. Again, the material is brought from a low position in the row, elevated over the row, reduced and then expanded. In retrieving the product the opposite action takes place in that the material is lifted off the row, run through the tower sweep, reduced and put back on the spool which again is at a ground level profile.

In the system for layout of the PCCM from the reusable spools, the reusable spools of wound PCCM are taken from storage and reused by unrolling them onto the rows of crops. The system is basically the same as that of the retrieval system except that the spool of wound PCCM is mounted on the tower rather than the sweep and allowed to unroll onto the crops.

The object of the present inventions is to efficiently and effectively layout, retrieve and store PCCM, which are used to protect crops from nuisance animals, most notably vines from particular birds, and damaging weather.

A further objective is to provide a system which minimizes crop damage during the covering and uncovering process.

A further objective is to provide a crop covering system that utilizes elements, some of which were formerly thought to be single use items, which may be easily stored and reused and inexpensive machinery, which reduces manual labor and increases speed of application and retrieval of the coverings.

A further objective is to provide such a device that is adapted to be mounted to conventional farm tractors.

A further objective is to provide a system of applying crop protection materials from a low to ground profile to up and over the row so that the majority of the weight of the material is close to the ground both in laying out and retrieving material instead of being suspended above the crops.

A further objective is to provide a method of handling protective coverings that does not require the use of special material handling equipment These and other objects and advantages will become evident upon reading the following description which, taken with accompanying drawings, describe a preferred and alternate embodiments of the invention.

DETAILED DESCRIPTION OF THE PREFERRED EMBODIMENTS

The present invention discloses generally a bulk PCCM (for the purpose of discussing the drawings and the embodiments below, netting will be used as an example of the PCCM, but it should be known that any PCCM may be used) roll layout system, a net retrieval system for disposal or reuse and a spooled roll layout system. The layout and retrieval systems incorporate a low profile carrier for bulk rolls or individual spools which may be stored and reused. Such a low profile carrier provides a safe method for transporting rolls or spools through fields and facilitates ease of loading and unloading.

Figure 1:
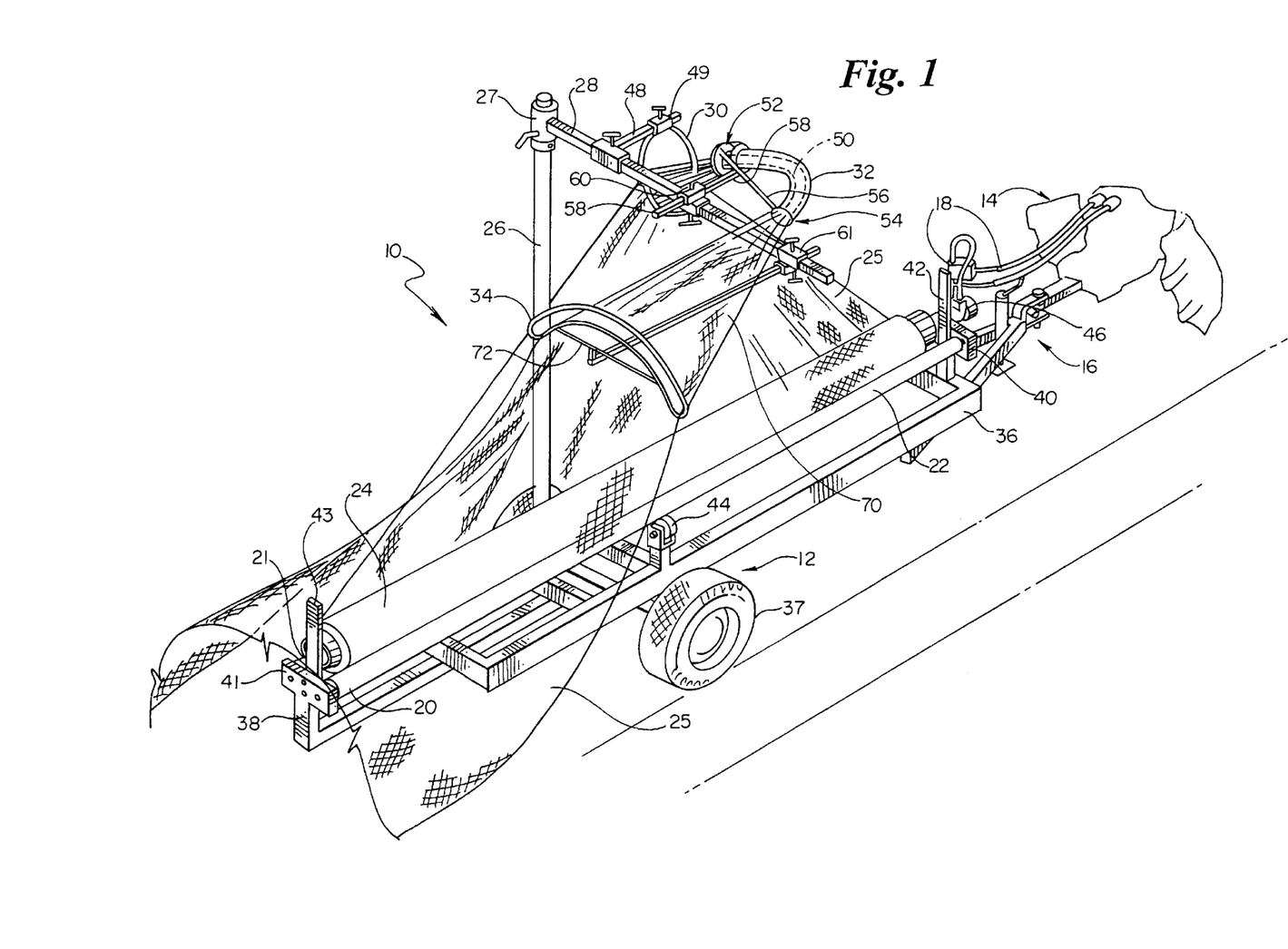
FIG. 1 is perspective view of a protective covering layout system.

FIGS. 1–4 disclose a tower and sweep arrangement that places netting over vine rows for protection of said rows. FIG. 1 illustrates the bulk netting roll layout system (BRLS), generally designated as 10. The BRLS carries a bulk roll of netting and dispenses the netting over crops. The BRLS consists of a trailer 12 which may be hitched to a tractor 14 (not fully shown) via a standard hitch system 16, which incorporates an optional auxiliary hydraulic system 18. The trailer 12 carries a rolling cradle 20, which may be configured and constructed to accept any type of roll or spool of covering, utilizing powered or idler rollers 21,22, powered by the hydraulic motor 46 which is driven by the hydraulic system 18. The rolling cradle 20 carries and lays out the bulk roll 24 (may also carry spools) of netting. To form the tower, a pole 26 is also mounted on the trailer 12 and supports a boom 28 at approximately a 90° angle. It should be understood that the tower be of such construction as to suspend the sweep over the row of crops and not limited to a particular angle. A guiding ring 30 is connected to the boom 28 to guide the netting 25 from the bulk roll 24, as seen in FIG. 1, into a sweep 32, also mounted on the boom 28, which guides and redirects the netting 25 90° (It should be understood that the sweep be of such construction as to direct the netting into alignment with the row of crops and not limited to a particular angle). As the netting 25 exits the sweep 32 it is then guided through a dispersement guide 34, which is also mounted to the boom 28. The dispersement guide 34 aids in the laying of the netting by spreading the netting from it's "roped" configuration as it exits the sweep 32 to a "fanned" configuration to cover the crops more effectively.

The preferred trailer 12 is as shown in FIG. 1. The trailer 12 should be a low profile trailer which may be towed between rows of crops. The trailer may be towed via a tractor 14 utilizing a standard hitch 16. The trailer's 12 purpose is carry the bulk roll 24 and facilitate laying of the netting. As such, the trailer is constructed to provide such a function. The trailer 12 (in this example a bin trailer) is preferably a heavy duty (steel) mobile (tires 37) frame 36 which may support a standard roll of netting, which can be approximately 200 to 1000 pounds. Preferably, the trailer should be able to support two rolls for dual dispersement/retrieval or just to have an extra roll when the first is completed.

Figure 8:
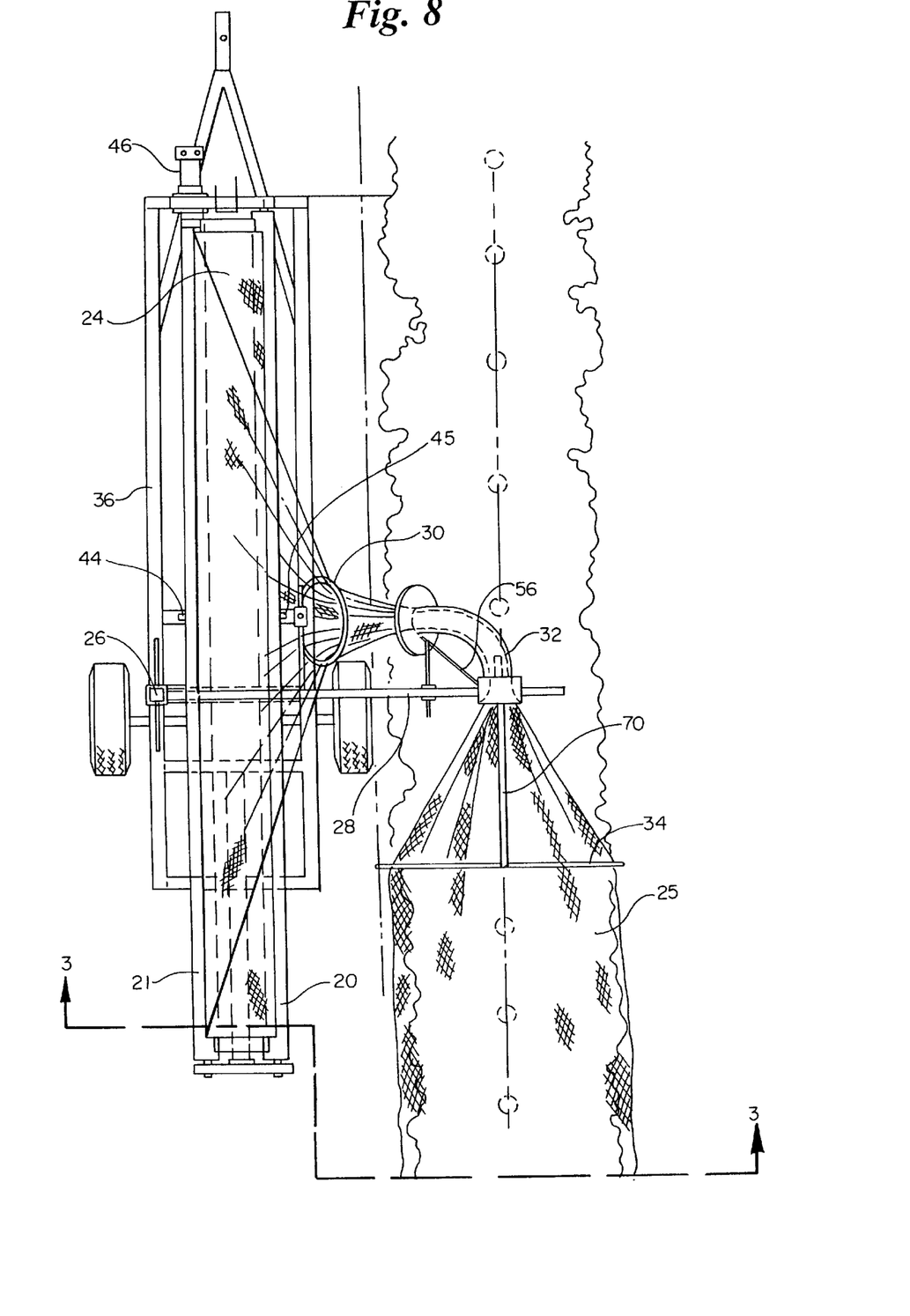
FIG. 8 is a top view of a protective covering layout system in progress.

The rolling cradle 20 can be mounted on a dedicated trailer or in a frame that is designed to attach to a standard 4-row vineyard/orchard trailer or a bin trailer. The purpose of the rolling cradle 20 is to support and rotate the bulk roll of netting 24. The cradle 20 consists of two parallel rollers 21,22, preferably PVC rollers, rotatively mounted at either end to a support frame 38, which is connected to or integral with the trailer 12. The support frame 38, preferably is a heavy duty metal of a welded tube type, Structural Grade, A-500-72 Gr. B. The forward and rear ends of the rollers 21,22 are rotatably connected, preferably via 1½ inch stub axle and flange bearings, to T posts 40,41 in parallel fashion to receive a bulk roll of netting 24. Retaining posts 42,43 are also connected to the support frame 38 and aids in retaining the bulk roll 24 in place on the rollers 21,22 to prevent longitudinal sliding of the roll 24. Support rollers, 44, 47 (the right support roller 47 shown is shown in FIG. 8, and is a mirror image of support roller 44) are also mounted on posts which are mounted on frame 36 to support rollers 21,22, to prevent outward bowing of the rollers 21,22, under the weight of the bulk roll 24. The support frame 38 should be longitudinally adjustable to adapt to longer rollers 21,22 and bulk rolls 24.

The rollers 21,22 are preferably driven in a clockwise and counter clockwise direction, respectively, to rotate the bulk roll 24 to release the netting 25, by a close coupled orbital motor 46 with a pressure compensated flow control. A conventional hydraulic system 18 may be used to control the rotation from the tractor 14. Due to the great weight of a bulk roll 24, typically at least one of the rollers 21,22, or both in unison, or the bulk roll 24 itself, should be rotatably driven. Bearings may be incorporated to roll the rollers 21,22, driven merely by the drag of the netting 25 over the crops. The rolls may also be ground driven. The drive means may be constructed in other manners, as long as the bulk roll 24 may be controllably unrolled so as to not bind up or damage the crops. Conventional motors and hydraulic control systems are well known to achieve this task.

The support pole 26 is also vertically mounted on the trailer 12, frame 36, and preferably is a heavy duty metal of a welded tube type, Structural Grade, A-500-72 Gr. B. Also preferably, the tower 26 is round in shape to accommodate vertical adjustment of the boom 28, via a vertically adjustable mount/clamp 27, most preferably a sliding mount, upon which the boom is mounted.

The boom 28 as such is vertically slidably mounted on the support pole 26. The boom 28 extends substantially perpendicularly from the support pole 26 as well as from the direction of the trailer 12. The boom, as illustrated, supports the guidance elements (30, 32, 34) such that the netting may be laid from directly above the crops.

The guiding ring 30 is adjustably, preferably slidably, mounted on cross bar 48, via an adjustable mount/clamp 49. The cross bar is in turn connected to the boom 28, preferably slidably/adjustably along the length of the boom 28. The guiding ring 30 is not only adjustable along the length of the cross bar 48, but also adjustable around the axis of the cross bar 48. As stated above, the guiding ring 30, aids in collecting and directing the netting 25 into the sweep 32.

Figure 2:
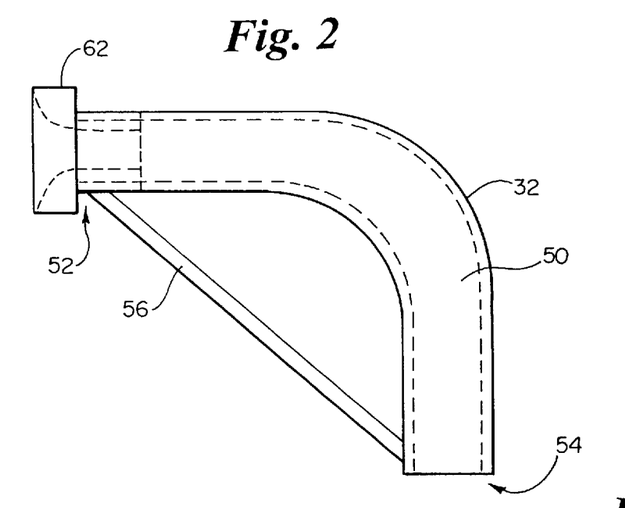
FIG. 2 is a detailed view of a sweep.
Figure 3:
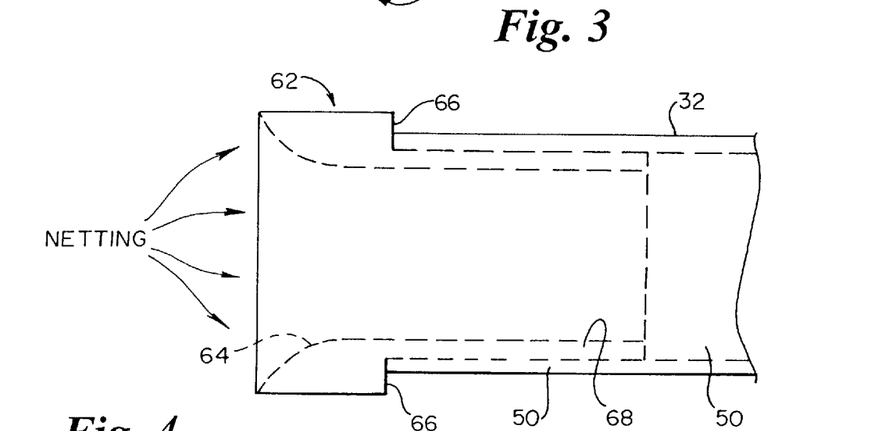
FIG. 3 is a blow-up proportional view of a sweep.

The sweep, or collector tube, 32, as seen in FIGS. 1–3, is essentially a guiding tube made of any rigid material, preferably steel having a plastic wear liner. The netting 25 is fed into the sweep 32 and is rerouted by about 90° to align the netting 25 with the rows of crops. The sweep, as seen in FIGS. 1–3, comprises a curved tube 32 having a conduit 50 therethrough and an entry end 52 and an exit end 54. The tubing is curved in about a 90° angle, or at an appropriate angle as mentioned above, and is supported by a support bar 56, which is secured to the tubing 32 at the entry end 52 and at the exit end 54. The support bar 56 is connected to an additional cross bar 58 which is mounted in a double adjustable mount/clamp 60 which allows for adjustable/ slidably movement along both the cross bar 58 and the boom 28. The sweep 32 may, at its entry end 52, or at both ends, a periphery washer-like ring or trumpet-like configuration to aid in the feeding of the netting 25 into the sweep 32. When the netting passes through the sweep it ropes down to a narrow configuration and as a result becomes abrasive. As such, the sweep should be lined or at least have a protective insert at the entry end of the sweep. Preferably, the sweep 32 is steel having a Ultra High Molecular Weight (UHMW) polyethylene insert 62 to prevent wear on the sweep 32 and on the netting 25, as shown in FIGS. 2–3. The insert 62 comprises a trumpet-shaped interior conduit 64, a steppedup rim 66 and an engagement portion 68 which snugly fits within the entry end 52 of the sweep 32. The insert 62 prevents wear of both the sweep 32 and the netting 25 itself. To further protect the netting, an inside liner with a low coefficient of friction may also be incorporated to line the fill length of the sweep conduit 50.

Figure 4:
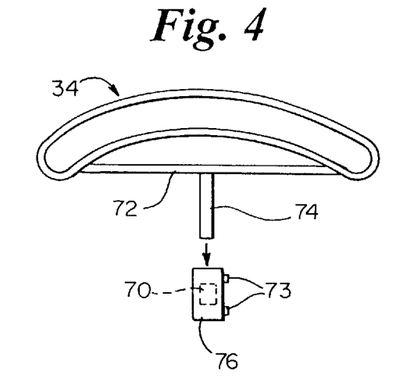
FIGS. 4–5 are perspective views of a dispersing guide.
Figure 5:
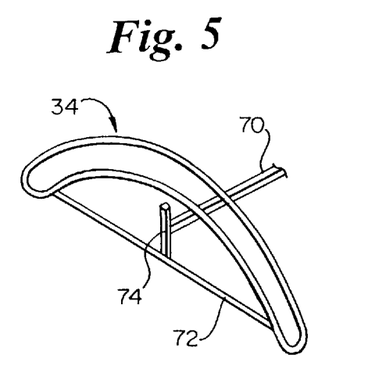

After the netting has been rerouted and exits the sweep 32, it is allowed to fan out/disperse and is guided over the crop rows by the dispersing guide 34. The dispersing guide 34 is mounted on a third crossbar 70 which in turn is slidably secured to the boom 28 via a second double adjustable mount/clamp 61 which allows for adjustable/slidably movement along both the cross bar 70 and the boom 28. The arcuately-shaped dispersing guide (elongated kidney-shaped guide) is further illustrated in FIGS. 4–5. As can be seen, the arc of dispersing guide 32 is preferably and substantially in a vertical plane and has a supporting cross bar 72 connecting the ends of the dispersing guide. Preferably, the supporting cross bar 72 has a securing post 74 extending from the cross bar 72 inwardly in relation to the arc of the dispersing guide 34 and adjustably and releasably mounted to the (may be welded thereto) cross bar 70 via an adjustable mounting brace 76, which perpendicularly is mounted on the end of the cross bar 70 (seen in phantom in FIG. 4). The securing post 74 may also be welded to the end of the cross bar 70 as seen in FIG. 1. The securing post 74 may also extend from the cross bar 72 outwardly in relation to the arc of the dispersing guide 34 and mounted on the end of the cross bar 70 as seen in FIG. 5, via a conventional mounting brace or via welding. Said mounting brace receives the securing post 74, as seen in FIG. 4, and is secured by tightening screws 73. The spread of the netting may be somewhat controlled by varying the size of the dispersing guide 34 and the acuteness of the curvature of the guide 34.

Figure 6:
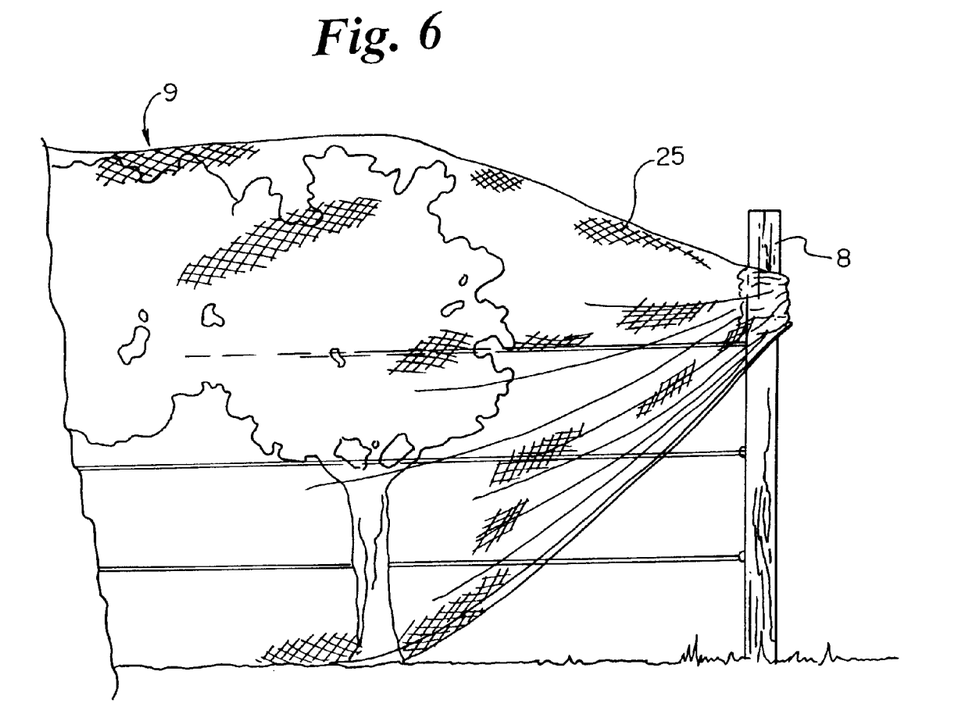
FIG. 6 is an illustrative demonstration of a laying of netting upon targeted crops.

Preferably, before beginning laying netting over a particular row of crops, the end of the netting should be anchored at the starting end of the row. After the netting is initially unrolled from the bulk roll 24 and fed through the guide ring, the sweep and the dispersing guide, the end of the netting is gathered together and preferably bound, such as with duct tape (whipping). The end is then anchored by a secured body, such as a post 8 at the end of a crops row 9, as illustrated by FIG. 6. The anchoring of the end of the netting allows for tension in order to achieve a smooth, secure covering of the crops.

Figure 7:
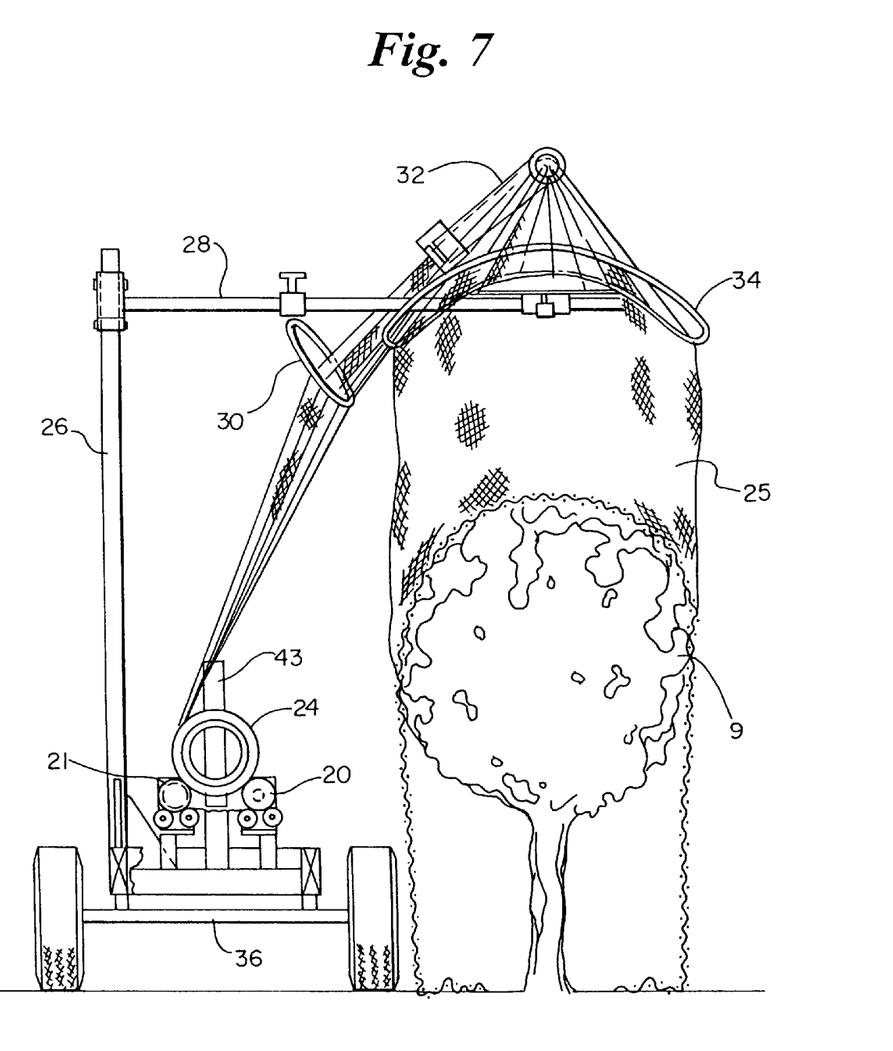
FIG. 7 is a rear perspective view of a protective covering layout system in progress.

FIG. 7 further illustrates a rear view of the working apparatus and how the apparatus of the present invention smoothly and efficiently covers the row of crops as the tractor tows the trailer between the rows. Notice should be made to the numerous amount of adjustable elements incorporated in the device such that the height and width of the rows can be accounted for.

FIG. 8 still further illustrates a top view of the working apparatus.

The system illustrated above in FIGS. 1–8 can also be modified to accept and disperse other various holders or carriers of protective covering materials, such as smaller rolls or spools. The cradle need only be designed to allow the carrier to unroll at a controlled rate such that the protective covering is evenly dispersed onto the row of crops without creating too much or too little tension. For example, for smaller bulk rolls and spools a smaller cradle system may be used or, if the carrier incorporates a bore, as with conventional spools, a support may be constructed on the frame to suspend the carrier so that it may freely unroll or unroll in a controlled manner in cooperation with the speed of the tractor, such as with a hydraulically controlled rotation system, similar to the system mentioned above. In any case, by carrying the carrier on the trailer, low to the ground and feeding the protective covering up through the tower/sweep arrangement, better and safer control may be maintained.

FIGS. 9–13 illustrate the protective covering retrieval system 100, specifically the method and apparatus for retrieving the netting after it has been laid for disposal or to reuse in a reverse manner. Generally, this system consists of a hydraulically driven arbor shaft that accepts spools for retrieving netting for reuse or disposal. The shaft is mounted into a frame that is then hitched to a tractor. The netting is retrieved evenly onto plastic spools for reuse at a later time or onto the permanent spool that facilitates disposal in tightly compacted rolls. Netting is pulled off the vine row utilizing the same tower and sweep arrangement used in the above mentioned bulk roll laying system. This tower arrangement is manipulated over the rows of crops by attaching it to the same frame that carries the retrieval head.

Figure 9:
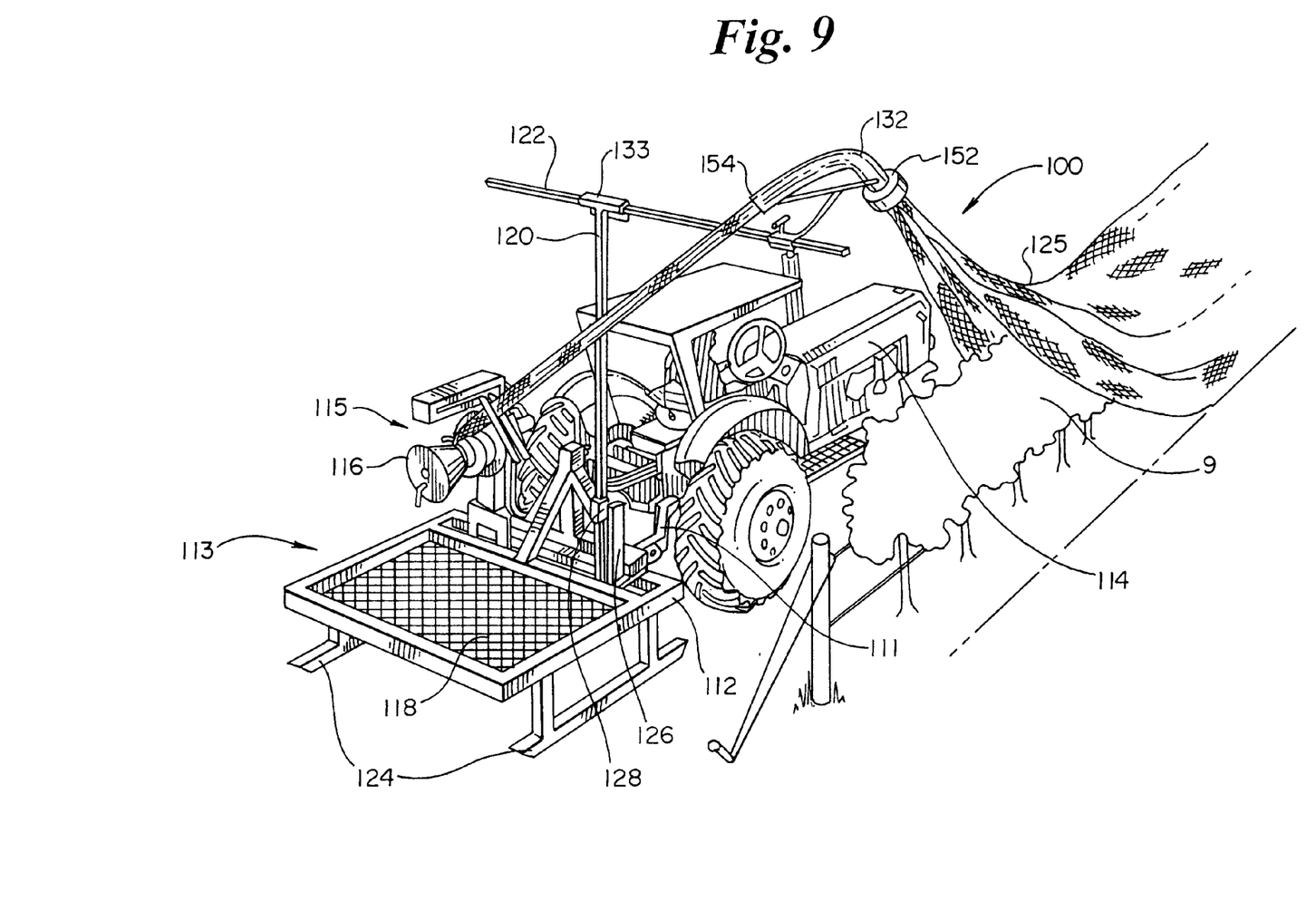
FIG. 9 is a perspective view of a protective covering retrieval system.

Referring to FIG. 9, the tractor 114 carries a three point implement, herein referred to as trailer 112, via a standard hitch 111, preferably a category II 3-point mount, in such a manner by which the trailer 112 may be suspended slightly above ground during movement. The trailer 112 comprises a frame 113 which supports a level wind system 115 which receives spools 116 for retrieving the netting 125 in an even, tight package. The frame 113 also supports a deck/screen 118 to hold empty or full spools or rolls of wound netting for disposal. For the tower, a vertical support pole 120, which is also supported by the frame 113, in turn supports a boom 122 and an angled sweep 132 (preferably a 4-inch EMT (electrical metallic tubing) 90° Sweep with a UHMW wear liner). As the tractor moves forward between the rows, the netting is lifted from off the row of crops, through the sweep and reeled evenly onto a spool. Each element of this system is discussed separately and in more detail below.

The trailer 112 comprises a frame 113, which is a welded tube type structure, preferably structural grade, A-500-72 Gr. B. As mentioned above, the trailer is coupled to the hitch of the tractor, preferably via a category II 3-point mount which allows the driver to raise the frame when in motion and lower the frame 113 when idle.

The level wind system 115 and the raising and lowering of the frame is driven by a conventional tractor and tractor auxiliary hydraulics, both of which are well known. As shown in FIG. 9, the rear of the frame 113 forms a deck or screen 118 to hold empty or full spools or rolls of wound netting for disposal. The frame 113 also comprises skids 124 which support the frame when at rest.

The frame 113 further supports a mounting bracket standard 126, which is vertically mounted thereon. The support pole 120, which is similarly discussed above, is vertically mounted on the bracket standard via adjustable clamp 128. The support pole 120 may be vertically adjusted by loosening and tightening the adjustable clamp 128.

A boom 122 is horizontally mounted to the support pole 120 via an adjustable T clamp 133. The T clamp 133 may be loosened or tightened to adjust the length of the boom 122 on either side of the T clamp 133. As shown in FIG. 9, the boom 122 supports the sweep 132. The sweep 132 is basically configured as described above in the net laying system, except that it is reversed in its direction. The entry end 152 (the gathering fairlead) faces the crops, from which the netting is drawn, and the exit end 154 faces the level wind system 115, to which the netting is retrieved. Otherwise, the sweep 132 is attached to the boom 122 as discussed above in the net laying system.

The frame 113 also supports a level wind system 115 which is hydraulically actuated via a chain drive and incorporates a mounted rotating shaft, an oscillating linear actuator and removable PVC wear guides. The drive system which rotates the spools is preferably a close coupled orbital motor with down stream pressure sensing flow control which may be controlled through the tractor's hydraulic system by the driver.

Figure 10:
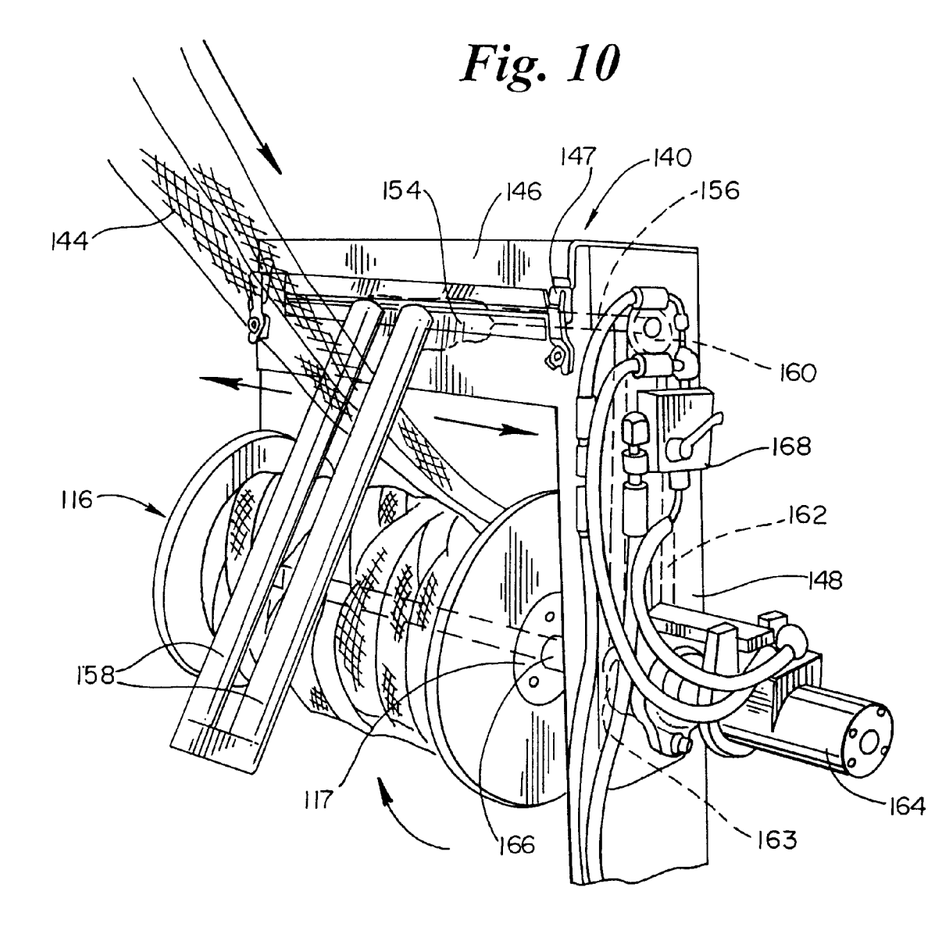
FIG. 10 is a perspective view of a levelwind system.
Figure 10A:
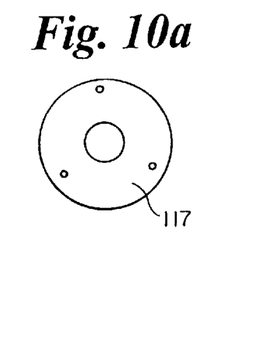
FIGS. 10a and 10b are illustrative views of the arbor shaft and the bolted flange.
Figure 10B:
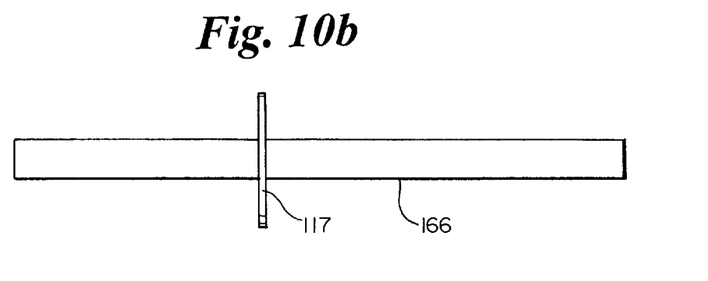

FIG. 10 shows a more detailed view of the level wind system mechanism 115. In this embodiment, the netting is reeled onto a permanent spool 116, which is preferably constructed from formed and welded 12 gage HR steel, having a bolt on flange mount 117 for attachment to the arbor shaft 166. The bolt on flange mount 117 secures the spool 116 the arbor shaft 166 and is further illustrated in FIGS. 10a and 10b. The bolt on flange 117 is welded to the arbor shaft and bolted to the spool 116 The level wind system comprises a level wind housing 140 mounted upon the frame 113, wherein the level wind housing 140 is preferably in the configuration of an upside down L (herein referred to as short leg of the L 146 and long leg of the L 148) such that the loaded spool 116 is facially exposed the exit end of the sweep to best receive the gathered netting 144. The short leg 146 has a secured access lid 147 and houses a levelwind axle 156 and a level wind follower 154 which oscillates back and forth along the level wind axle 156. A guide 158, preferably a pair of parallel rods which are preferably tubular, are connected at one end to the levelwind follower 154 and extend at an angle downward across the open face of the spool 116 as shown in FIG. 10. The guides 158 oscillate back and forth across the face of the spool 116 allowing for even reeling of the gathered net 144, which travels between the pair of rods of the guide 158. The levelwind axle 156 is coupled to a levelwind driven sprocket 160, which in turn is driven by a levelwind belt 162 which communicates the levelwind driven sprocket 160 in motion with a levelwind drive sprocket 163 which is driven by an orbit motor 164. The orbit motor 164 also drives the spool axle 166 which in turn rotates the spool 116. As mentioned above, the motor 164 is preferably hydraulically powered, and, in this particular embodiment a selector valve 168 is mounted on the outer surface of the long leg 148 to regulate the hydraulic system and as such, the speed of the orbit motor 164. Since the orbit motor 164 drives both the rotation of the spool 116 and the levelwind follower 154, they move in cooperation to evenly reel the netting.

Figure 11:
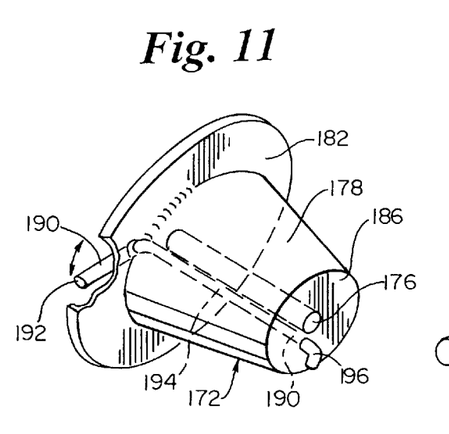
FIG. 11 is a perspective view of a proximal half of a permanent spool.
Figure 12:
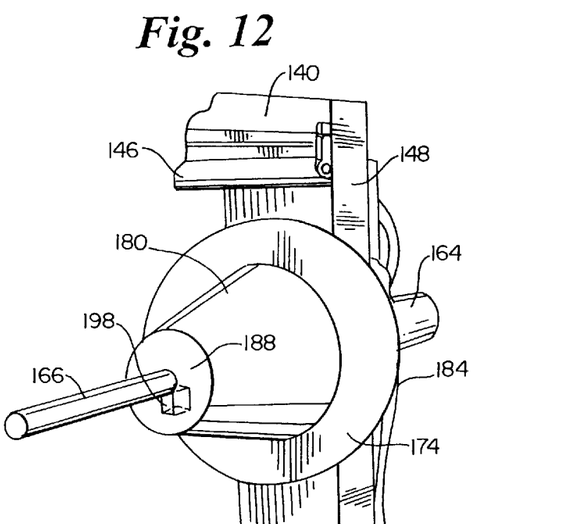
FIG. 12 is a perspective view of a distal half of a permanent spool.
Figure 13:
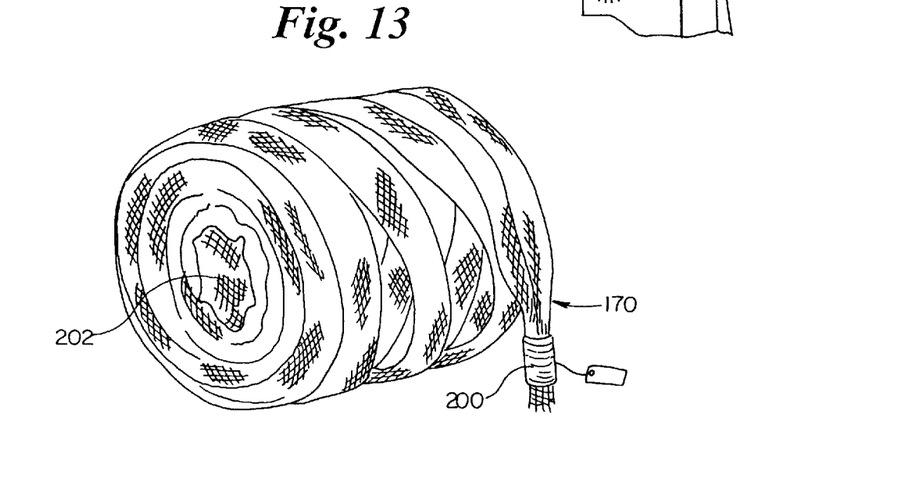
FIG. 13 is a perspective view of the resulting wound netting after retrieval.

FIGS. 11–13 illustrate in a more detailed fashion the two part permanent spool 116 and the reeled gathered netting 170. As shown in FIGS. 11–12, the spool 116 has basically two parts, a distal half 172 and a proximal half 174, both having a bore 176 therethrough to accept the axle 166. Both halves, as illustrated, have truncated cone portions 178,180, a flange 182,184 on the base of the cones and a flat top portion 186,188. To secure the cone portions 178,180 on the axle 166 to form the spool 116, a locking lug 190 is provided in the distal half 172. The locking lug 190 has a locking lug lever 192 at its proximal end and extends through a bore 194, which is substantially parallel to bore 176, protruding from the flat top portion 186. At the distal end of the locking lug there is provided a key portion 196. As the distal half cone 172 is slid onto axle 166, the key portion is accepted by a locking lug hole 198 provided in the flat top portion 188 of the proximal half spool 174. To lock the two half spools together, lever 192 is merely turned around the axis of the locking lug 194. To maintain the lock, a spring loaded locking means may be provided to maintain the tension on the lever 192.

FIG. 13 shows a wound netting 170 after being removed from the temporary (trash) spool 116. The netting at this point is wound in a neat bundle 170 and may be disposed of or stored. As mentioned above, the ends of the netting may be bound to form a whipping 200, and may be tagged and stored for a particular row when wound upon a reusable spool.

Conventional spools may also be mounted and secured on the levelwind system in place of the permanent spool and secured in place. The netting may be retrieved in the same manner as discussed above with regard to the permanent spool. This method provides a wound length of netting loaded onto a reusable spool which may be stored for later use. Preferably, the spool is a conventional plastic spool having a hollow core with retaining flanges with the appropriate core length and flange diameter to match the amount and type of material retrieved to the carrying capacity of the operator, i.e., 50–70 pounds. The core diameter should be large enough to snugly fit the arbor shaft mentioned above. Such spools include an Andros Engineering Agri-Spool II which may be obtained from Andros Engineering, located in San Margarita, Calif.

These reusable loaded spools may also be loaded onto the levelwind mechanism on the arbor shaft after the permanent spool has been removed and the netting may be laid out over the crops by utilizing the same retrieval head, frame, tower and sweep arrangement used for retrieving. The valving to the shaft's drive motor can be manipulated to allow the motor to freewheel and the levelwind head is disengaged. The netting is pulled off the freewheeling spool, fed into the entry end of the reversed sweep and over the row of crops, driven merely by the tension created by the anchor and crops. For dispersal, loaded reusable spools may be seated on the above mentioned cradle or just a single axle mounted on the trailer.

Figure 14:
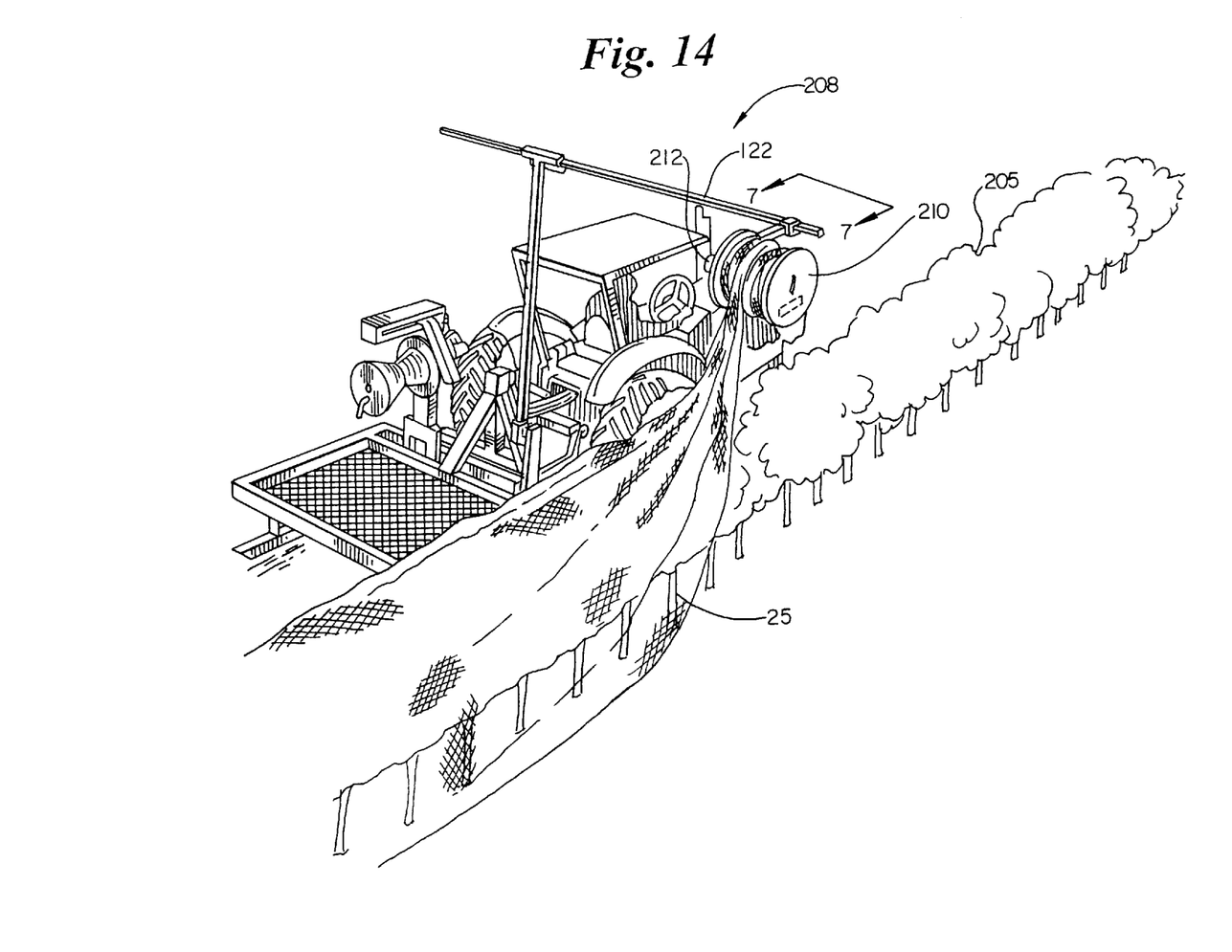
FIG. 14 is a perspective view of an alternative protective covering layout system utilizing a reusable distribution spool of netting.
Figure 15:
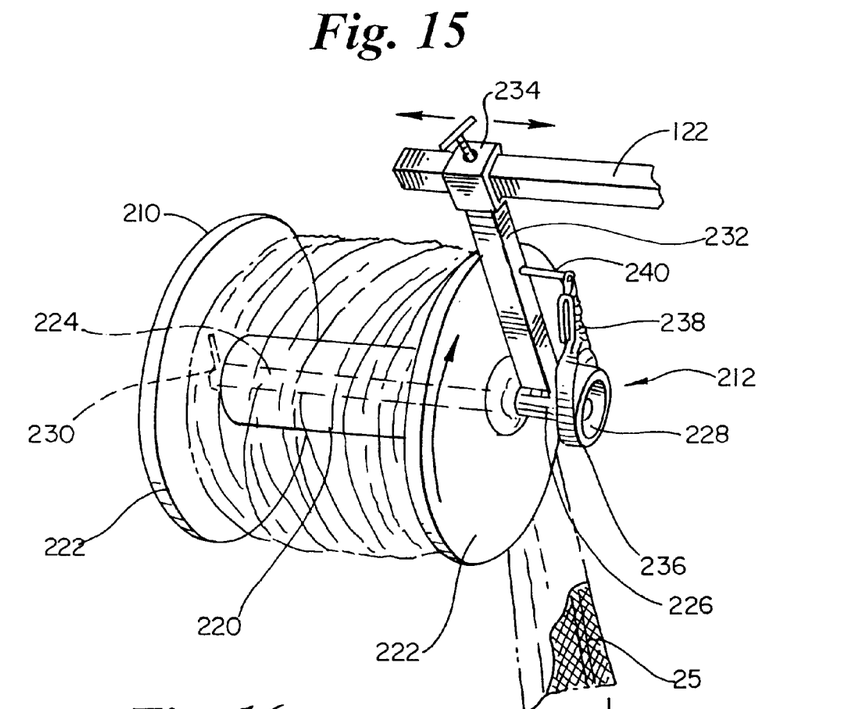
FIG. 15 is a detailed perspective view of a mounted distribution spool.

FIGS. 14–15 illustrate a redistribution system 208 an alternative system of spooled roll layout, wherein the reusable spools of wound netting 170 are taken from storage and reused by unrolling them onto the rows of crops 205. The system is basically the same as that of the retrieval system except that the spool of wound netting is mounted on the tower rather than the sweep. Such a system is shown in FIG. 14.

As seen in FIG. 14, the reusable spool of wound netting, or distribution spool, 210 is mounted on the boom 122 and is allowed to unroll under the tension created by the dragging over the crops and primarily from the anchored end of the netting, as discussed above. A brake 212 may also be incorporated to prevent over spinning of the spool 210 so as to provide for a smooth laying of the netting.

FIG. 15 illustrates in more detail the distribution spool 210 and its mounting to the boom 122. As is conventional, the spool 210 comprises a spool drum 220 having a conduit therethrough and two retaining flanges 222. The distribution spool 210 is mounted onto an axle 224, shown in phantom, flush with an axle housing 226 from which the axle 224 extends. The axle extends through the axle housing 226 and is coupled with a brake drum 228. The distribution spool 210 is secured on the axle 224 via a retainer means 230, such as a clamp or a pin, such as a lynch pin. The spool is connected to the boom 122 via a cross bar 132 which is affixed to the axle housing 226 at one end and the boom 122 at the other end via a slidably adjustable clamp 234. The brake 212 comprises a brake belt 236 wrapped around the brake drum 228 and a tension spring 238 secured at one end to the brake belt 236 and to an anchor post 240, which is mounted on the cross bar 232, at the other end. The tension spring 238 provides sufficient tension to prevent the spool 210 from over-spinning and releasing netting prematurely, but is loose enough to prevent tearing of the netting and damage to the crops.

Figure 16:
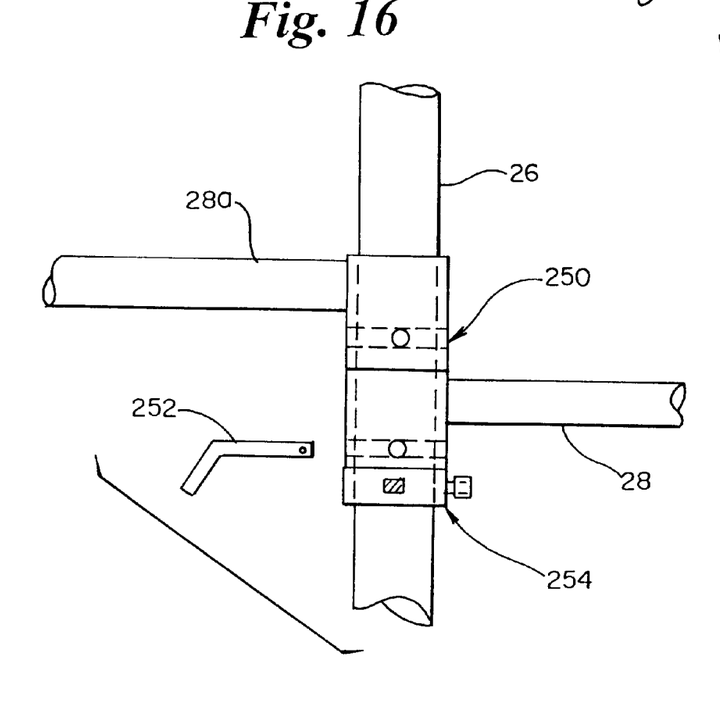
FIG. 16 is an illustrative view of mounting clamps mounting multiple booms onto a tower.

For each embodiment disclosed above, a modification may be made to provide for dual retrieval or layout systems on one trailer, such that the row of crops on either side of the tractor can be covered. In the case of the layout system for bulk rolls, a two row machine may be configured such that netting may be laid on two rows of crops. In such an embodiment, the rolls would be offset to the outside of the trailer with a common center column supporting opposing outrigger arms. Netting would be applied simultaneously to the rows immediately adjacent to the left and right sides of the trailer. FIG. 16 illustrates the manner in which two booms 28,28a may be mounted on the support pole 26 to allow for mirror images of the netting laying system. The collar 250 may be drilled at a 90° angle to allow for pin 252 securement in two positions for the booms for transport and for work. A thrust collar 254 keeps the booms in position on the support pole 26 also when switching from transport to work positioning. The systems of FIGS. 9 and 14 may also be set up in mirrored configuration to retrieve and layout netting from/on two rows of crops.

It should also be known that the above mentioned spools used for retrieval, the temporary spools or the reusable spools, may incorporate, preferably somewhere on the drum area of the reusable spool or the conical portion of the temporary spool, a snag, a hole or some kind of device to pinch or anchor the leading end of the covering when initially starting the winding operation so as not to have a laborer's hands caught in the spool.

The above mentioned hydraulically controlled drives of the different embodiments may be controlled by the operator of the tractor so that he may coordinate the speed of rotation of the rolls or spools during dispersement or retrieval of the protective covering with the speed of the tractor to prevent excessive tension of slack in the covering. This usually requires the operator to periodically look back at the trailer. Alternatively, a second operator may ride along on the trailer to control the speed of the roll or spool. Such hydraulic controls are well known in the field of agricultural implements.

This completes the description of the preferred and alternate embodiments of the invention. Those skilled in the art may recognize other equivalents to the specific embodiment described herein which equivalents are intended to be encompassed by the claims attached hereto.

What is claimed is:

1. An apparatus for dispersing protective covering material onto rows of crops, comprising:

a low profile support frame capable of being towed by a towing vehicle;

a rotational drive system capable of rotating and unfurling a wound roll of protective material, the rotational drive system being mounted on said frame;

a tower mounted on and extending substantially perpendicularly upward from the support frame above the rotational drive system; and     a collecting means, having an entry end and an exit end, adjustably mounted on the tower above the rotational drive system and capable of collecting the protective material from the wound roll and redirecting the path of the protective material from the roll toward and in line with a row of crops which is to be covered.

2. The apparatus of claim 1, further comprising a dispersement guide mounted to the tower, such that after the protective covering is redirected as it is fed through the dispersement guide prior to dispersement onto the row of crops.

3. The apparatus of claim 2, the rotational drive system comprising a cradle, constructed and configured to rotatably carry the wound roll of protective material.

4. The apparatus of claim 3, the cradle comprising two parallel rollers rotatably mounted on the frame and being capable of receiving a bulk roll of protective covering, at least one roller being controllably, rotatably driven by a motor so as to rotate and unroll the carried bulk roll.

5. The apparatus of claim 3, further comprising a guiding ring mounted on the tower, constructed and configured to receive the protective covering from the wound roll of protective material as it is unrolled prior to being collected by the collecting means.

6. The apparatus of claim 3, the tower being comprised of a support pole mounted substantially vertically on the frame above the cradle and a boom mounted substantially perpendicularly to the support pole, the collecting means and the dispersing guide being mounted on said boom, such that the dispersing guide is suspended over the row of crops when the frame is towed parallel to the row of crops.

7. The apparatus of claim 6, the collecting means being a tube curved at approximately a 90° angle, whereby during the dispersement of the protective covering, the protective covering is fed into the entry end of the collecting means and redirected approximately 90° and dispersed in line and over the row of crops.

8. An apparatus for retrieving protective covering material from off a row of crops and collecting the covering material, comprising:

a low profile support frame capable of being coupled to a towing vehicle;

a winding means for receiving and winding the protective material, said winding system mounted on the frame;

a drive system capable of driving the winding means, the drive system being mounted on said frame;

a tower mounted on and extending substantially perpendicularly upward from the support frame above the winding means and the drive system; and a collecting means, having an entry end and an exit end, adjustably mounted on the tower above the winding means and the drive system and capable of collecting the covering material from a covered row of crops and redirecting the path of the covering material from the row of crops and toward the winding means, whereby the covering material is removed from the row of crops and collected by the winding means.

9. The apparatus of claim 8, the tower being constructed and arranged to suspend the collecting means over the row of crops as the frame is towed parallel to the row of crops, such that the entry end of the collecting means is directionally in line with the row of crops and collects the protective covering and redirects the path of the protective covering as it is retrieved, wherein the collected protective covering exits the collecting means at the exit end of the collecting means in line with the winding means.

10. The apparatus of claim 9, the winding means comprising a spool mounted on a winding housing, the winding housing being mounted on said frame, said spool being rotatably mounted on the winding housing, wherein the protective covering is received and wound onto the spool.

11. The apparatus of claim 10, the winding means further comprising a spool axle mounted on the winding housing, wherein the spool is rotatably mounted on said spool axle and wherein the drive system is constructed and arranged to rotatably drive the spool axle, the spool thereby receiving and winding the protective covering.

12. The apparatus of claim 11, the winding means further comprising a level wind mechanism, having winding guides, mounted on the winding housing, the level wind mechanism constructed and arranged such that during the winding of the protective covering onto the rotating spool, the protective covering is fed through the winding guides and the winding guide oscillates back and forth across the open face of the spool in cooperation with the rotation of the spool, thereby evenly winding the protective covering onto the spool.

13. The apparatus of claim 12, the collecting means being a tube curved at approximately a 90° angle, whereby during the retrieval of the protective covering, the protective covering is fed into the entry end of the collecting means and redirected approximately 90° and dispersed in line and toward the winding means.

14. The apparatus of claim 12, the level wind housing being configured in the shape of an upside down L, having a long leg and a short leg, the long leg being mounted on the frame, and wherein the level wind mechanism comprises a level wind axle, a level wind follower and a level wind driven sprocket housed within the short leg of the level wind housing, the winding guides being mounted to the level wind follower and extending across the face of the spool, wherein the level wind follower oscillates back and forth along the length of the short leg in cooperation with the rotation of the spool axle.

15. The apparatus of claim 14, the drive means comprising an orbit motor, the orbit motor being cooperatively in mechanical communication with the level wind follower and the spool axle, such that the orbit motor is capable of driving the level wind mechanism and the spool axle in cooperation.

16. The apparatus of claim 15, wherein the drive means is hydraulically driven.

17. The apparatus of claim 11, wherein the spool is mounted on the spool axle, the spool comprising a distal half and a proximal half, each half having a containing flange and a truncated conical drum having a top portion at the narrow end of the conical drum, said proximal half being mounted on the spool axle and said distal half being removably mounted on the spool axle such that the top portions of the conical drums are opposingly situated.

18. The apparatus of claim 17, wherein the spool comprises a locking lug, said locking lug being capable of securing the distal half and the proximal half together when mounted on the spool axle.

19. An apparatus for dispersing a protective covering material from a spool onto a row of crops, comprising:

a support frame capable of being coupled to a towing vehicle;

a tower having a support pole vertically adjustably mounted to the support frame and extending substantially perpendicularly upward from the support frame;

a boom adjustably mounted perpendicularly to the support frame; and a dispensing arm having a cross bar slidably adjustably mounted to the boom and a loading bar mounted to the cross bar, the loading bar being constructed and arranged to receive a spool of protective covering material, the dispensing arm being adjustably mounted to the boom, said tower and dispensing arm being further constructed and arranged such that the dispensing arm is suspended directly above the row of crops when the support frame is towed parallel with the row of crops, whereby the covering material is dispensed onto a row of crops.

20. The apparatus of claim 19, wherein the loading bar is an axle perpendicularly mounted to the cross bar, wherein the spool may be loaded onto the axle.

21. The apparatus of claim 19, the dispensing arm further comprising a brake in communication with the axle, such that the loaded spool receives drag to prevent over-spinning during dispersement of the protective covering material.

22. A method of dispersing protective covering material onto a row of crops, comprising the steps of:

providing the apparatus of claim 1;

providing a bulk roll of wound protective covering material, such that it may be associated with the support frame, and such that, when the support frame is towed parallel with the row of crops, the bulk roll is also aligned parallel with the row of crops;

feeding the free end of the protective covering material through the collecting means;

anchoring the free end of the protective covering material along the row of crops; and towing the low profile support frame along side the row of crops and allowing the rotational drive system to unroll the bulk roll, thereby covering the row of crops with the protective covering material.

23. The method of claim 22 wherein the apparatus of claim 1 further comprises a dispersement guide mounted to the tower, such that after the protective covering is redirected as it is fed through the dispersement guide prior to dispersement onto the row of crops.

24. The method of claim 23, wherein the rotational drive system comprises a cradle, constructed and configured to rotatably carry the bulk roll of protective material.

25. A method of dispersing protective covering material onto a row of crops, comprising the steps of:

placing a bulk roll of protective covering material, having a free end, onto a low profile support frame, the support frame having a tower mounted on and extending substantially perpendicularly upward from the support frame and a collecting means mounted on the tower and capable of collecting the protective material from the bulk roll and redirecting the path of the protective material from the roll toward and in line with a row of crops which is to be covered;

feeding the free end of the protective covering material through the collecting means;

anchoring the free end of the protective covering material along the row of crops; and towing the low profile support frame along side the row of crops and unrolling the bulk roll, thereby covering the row of crops with the protective covering material.

26. A method of retrieving protective covering material from off a row of crops and collecting the covering material, comprising the steps of:

providing a low profile support frame capable of being coupled to and towed by a towing vehicle, wherein the support frame has a winding means for receiving and winding the protective material mounted on the support frame and a drive system capable of driving the winding means mounted on said support frame;

providing a tower mounted on and extending substantially perpendicularly upward from the support frame above the winding means and the drive system, and a collecting means mounted on the tower above the winding means and the drive system and capable of collecting the covering material from a covered row of crops and redirecting the path of the covering material from the row of crops and toward the winding means;

feeding the free end of the protective covering through the collecting means and securing the free end to the winding means; and winding the protective covering onto the winding means, whereby the covering material is removed from the row of crops and collected by the winding means.

* * * * *